W. E. BARTLETT.
Traction-Wheels.
No. 138,469.  Patented May 6, 1873.
Fig: 2.
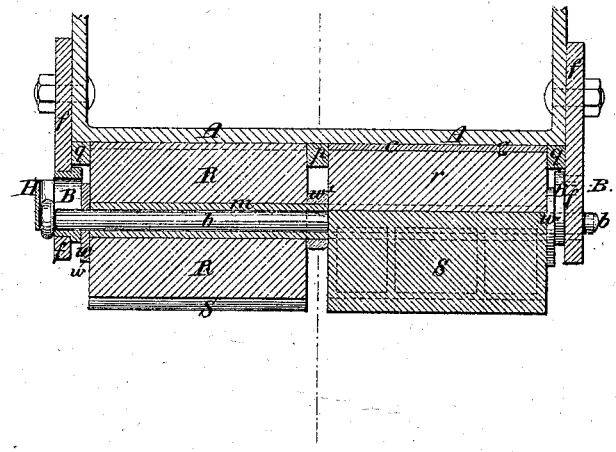
Fig: 1.
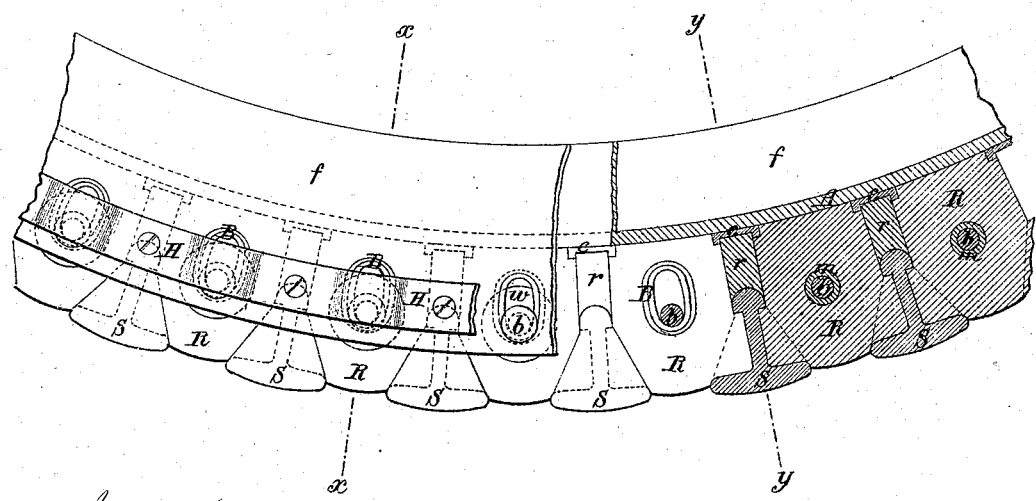

UNITED STATES PATENT OFFICE.

WILLIAM ERSKINE BARTLETT, OF EDINBURGH, NORTH BRITAIN, ASSIGNOR TO THE NORTH BRITISH RUBBER COMPANY, (LIMITED,) OF SAME PLACE.

IMPROVEMENT IN TRACTION-WHEELS.

Specification forming part of Letters Patent No. 138,469, dated May 6, 1873; application filed December 14, 1872.

*To all whom it may concern:*

Be it known that I, WILLIAM ERSKINE BARTLETT, of the North British Rubber Company, Edinburgh, North Britain, have invented certain new and useful Improvements in the Construction of Elastic Tires for Carriage-Wheels, of which the following is a specification:

This invention relates to a novel construction of elastic wheel-tire which will admit of being more easily and cheaply made than the continuous rubber tires hitherto in use, and can be repaired and replaced in detail, and at much less cost, and at places far removed from rubber-manufactories, where it would be impossible to repair a continuous tire. The invention is applicable to the wheels of carriages used on common roads, but is mainly applicable to the wheels of traction-engines, to which such tires afford a superior cushioning, while they yield better tractive results and economize power. Traction-engines furnished with such wheel-tires can be run at higher speeds and with more regularity than those with continuous tires, the metallic armor of which is, of necessity, placed on the surface and therefore liable to frequent injury and excessive expenditure for repairs. In my invention, on the other hand, the armor is cushioned and held by, and therefore works in unison with, the elastic parts, whereby the wear and tear of the armor are greatly reduced and a great saving of working expenses effected.

In carrying out my said invention I form the elastic part of the tire of a series of segmental blocks of vulcanized India rubber, and fit the same between the flanges with which the sides of the wheel are provided. These segmental blocks rest against the rigid tire or drum of the wheel and are kept in position by means of bolts, rods, or mandrels which pass through them and through suitable holes in the flanges of the wheel. These blocks may extend across the face of the wheel in one piece, or two or more pieces may be placed on the same bolt, rod, or mandrel, which together are equal to one such segmental block, in which case metal washers are placed on the mandrels to keep said pieces at any desired distance apart. By this means provision is easily made for the expansion of the rubber blocks endwise. Their expansion circumferentially is utilized for holding the metal armor or shoes of the tire, which is placed between said blocks and with which said armor works in entire unison. One very convenient form for the pieces or shoes forming said metal armor is that of a T, the horizontal arms of which are placed along the circumference of the wheel, and the perpendicular arm radially thereto between the elastic rubber blocks, as already mentioned. If said blocks are in two lengths across the wheel-face, it will be most convenient to have the metal shoes in two lengths as well. For more securely holding the shoes to and by the rubber blocks, the radial branches of the shoes are made cellular on each side, and the sides of the rubber blocks are formed to fit tightly into said cells. Further, the circumferential branches of the shoes are rounded on the outside and are sometimes even ridged, so as to improve the adhesion to the road in the case of frost and to ease their rocking between the rubber blocks. To securely hold the rubber blocks to the surface of the rigid inner tire or drum of the wheel I form cells on the surface thereof by riveting or screwing thereon metal bars, or in any other convenient way. The bases of the rubber blocks are formed to fit tightly therein, by which means, in conjunction with the bolts or mandrels, the blocks are held to the surface of the rigid tire, while their bases are prevented from grinding against said drum or inner tire. To provide a large bearing-surface for the bolts or mandrels carrying the rubber blocks, flanged studs or bushes are provided and passed through the openings in the wheel-flanges. These bushes can thus be renewed from time to time without injury to the wheel-flange. The radial arms of the metal shoes extend inward to about two inches short of the rigid inner tire of the wheel, to allow of compression, and the space between is filled with small blocks of India rubber, which rest between every two contiguous segmental blocks, and which thus receive the pressure from the radial branches of the shoes. These pieces, being small, are readily and cheaply renewed.

In the accompanying drawing, Figure 1 is a side view of part of a wheel fitted with my improved tire, and Fig. 2 is a cross-section, one-half—the left—along the plane of the radius $x$, the other half—the right—along the plane of the radius $y$.

A is the rigid inner tire, attached in any suitable manner to the wheel-sides or flanges $f$. To and across the rigid tire A grooved bars C are screwed or otherwise fastened. Into the spaces between these bars the elastic India-rubber segment-bearing blocks R are closely fitted, and in the groove of the bars the rubber bearing-blocks $r$ are set. The segment-blocks R are severally furnished with a hollow metal mandrel $m$, through which, as well as through the flanges of the wheels, bolts $b$ are passed. These bolts keep the blocks to the wheel-face A, or in position, and also the metal shoes S placed between and carried by the rubber blocks. The shoes S are provided with flanged ends and also with side projections, and enlarged heads, whereby their sides are made cellular, and they lock with the rubber blocks R, between which they are tightly pressed, and with which they work, move, and rock when under action on the road. The rubber blocks $r$ placed under the heads of the shoes assist, with the segment-blocks R, in cushioning the shoes. The bolts $b$ may be conveniently made with one solid head, as shown, and very conveniently held in the mandrel $m$ by a waved or corrugated hoop, H, screwed onto the wheel-flange on one side only. This hoop may be in three or four pieces or sections, if desired. To provide a wider bearing for the bolts $b$ than will ordinarily be got from the wheel-flanges, and also to make provision for easily and inexpensively renewing the working parts of such wheels, I pass said bolts through bushes B pierced with oblong holes and furnished with flanges. The washers $w$ carried by the bolts $b$ bear against the bushes and keep their flanges in contact with the wheel-flanges in which they are placed and by which they are carried. Immediately under these bushes, on each side of the wheel, and resting all round on the rigid tire A, firm rubber rings $q$ are placed, which, with the cross-bars C, form a cell in the face of tire A for the bearing-blocks R. If the face of the wheel-tire be divided into two widths it will be convenient to place a metal ring, $p$, similar to the rubber rings $q$ surrounding the middle of tire A, and to apply a metal washer, $w$, to the mandrel $m$ to keep apart, respectively, the bottoms and middles of the blocks R and $r$, which are then to be applied to the wheel in two widths.

Having now set forth the nature of my invention and explained the manner of carrying the same into effect, I wish it to be understood that I claim—

1. Elastic tires constructed of segmental blocks and the same secured to the wheels by means of transverse bolts and bushes, substantially as above described.

2. The cellular metal shoes constructed and retained in position on the wheel in the manner and for the purpose above described.

3. The combination of the segmental retaining-blocks R and the filling-blocks $r$ for sustaining the pressure of the shoes S while the same are passing over the ground, as set forth.

WM. E. BARTLETT.

Witnesses:
W. FIRTH,
   *Castle Mills, Edinburgh.*
ALEX. LAWSON,
   *Castle Mills, Edinburgh.*